United States Patent [19]

Stransky

[11] 4,138,212
[45] Feb. 6, 1979

[54] PROCESS FOR PRODUCING WATER AND OIL SOLUBLE CURCUMIN COLORING AGENTS

[76] Inventor: Charles E. Stransky, 2442 S. 75th St., West Allis, Wis. 53219

[21] Appl. No.: 823,242

[22] Filed: Aug. 10, 1977

[51] Int. Cl.² .................. A23L 1/28; C09B 62/00; A23L 1/275
[52] U.S. Cl. .................................. 8/80; 8/53; 426/250; 426/540; 260/236.5
[58] Field of Search ............... 8/80, 53; 426/431, 540; 260/236.5

[56] References Cited

U.S. PATENT DOCUMENTS 306,434   10/1884   Savigny .................................. 8/80

OTHER PUBLICATIONS

Chem. Abstracts, vol. 74, 1971, 74:10540t.

*Primary Examiner*—Donald E. Czaja
*Assistant Examiner*—Maria S. Tungol
*Attorney, Agent, or Firm*—Ralph G. Hohenfeldt

[57] ABSTRACT

Water soluble curcumin coloring agent is produced from ground turmeric root by washing the root with a soap solution in which the curcumin dissolves. A subsequent treatment of the solution with acid precipitates the curcumin and produces a paste or putty which is dispersible in fatty based substances.

14 Claims, 1 Drawing Figure

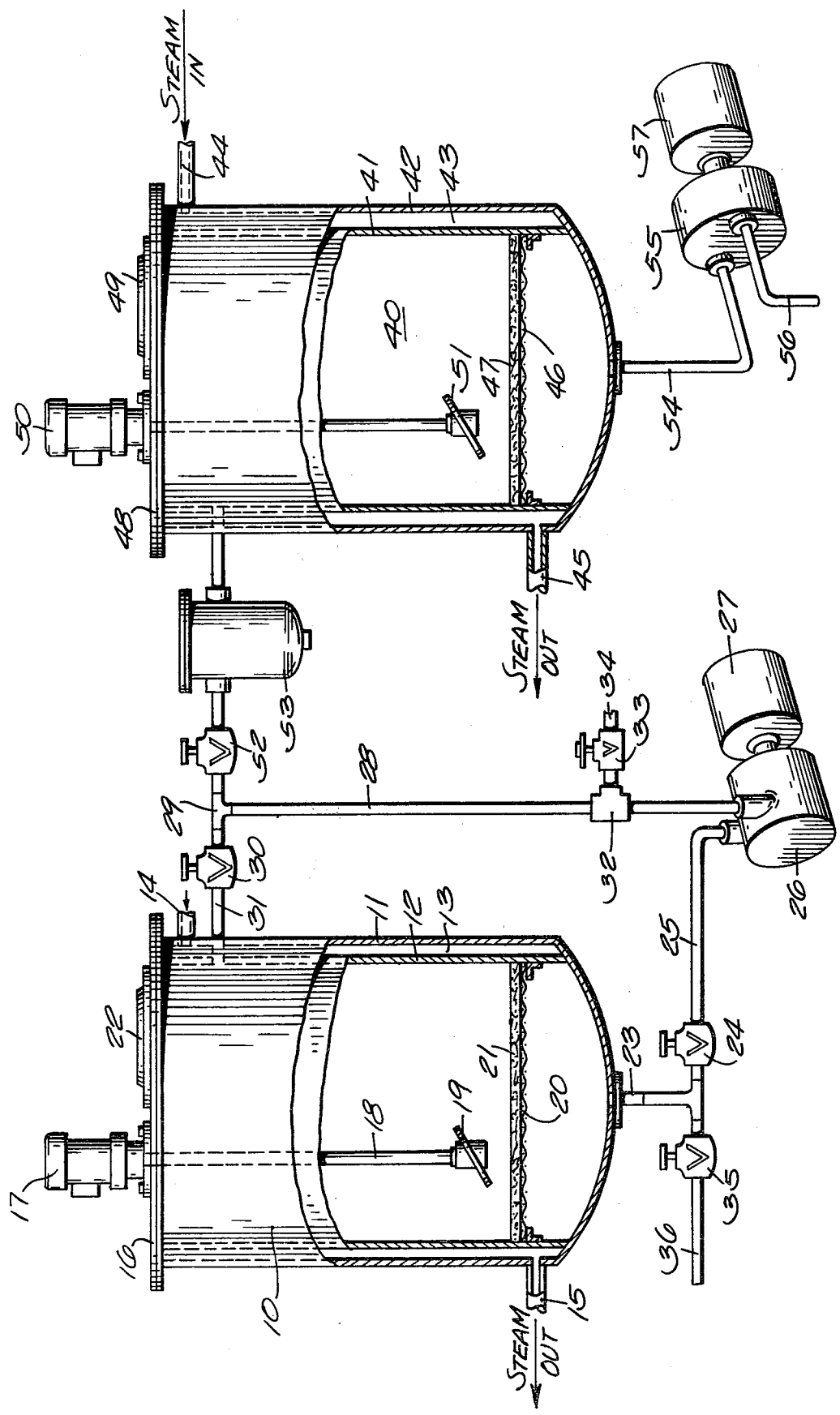

PROCESS FOR PRODUCING WATER AND OIL SOLUBLE CURCUMIN COLORING AGENTS

BACKGROUND OF THE INVENTION

This invention relates to a method of extracting curcumin from turmeric root and, in particular, to a method which yields various water soluble and oil soluble forms of curcumin.

Ground turmeric root (Curcuma Longa) has a spicy flavor and is commonly used as a condiment and coloring agent in currys, rice and other foods. The root also provides a source of curcumin which is the coloring matter in the root. Curcumin which has been extracted by traditional methods is an orange-yellow crystalline powder. It has been used in various ways to color consumable products such as ice cream, cheese, pickles, vegetable oil shortening, oleo margarine, medicines and others.

The traditional commercial method of extracting curcumin starts with grinding the hard precooked and dried turmeric roots, called fingers, until a powder is formed which has a granule size about equal to ordinary sugar. The ground root is then put in a vessel through which hexane is circulated to remove some of the oils from the root. This step is followed by further washings with a mixture of hexane and alcohol in which curcumin is soluble. Upon further treatment with more concentrated alcohol, the colorful curcumin is extracted and is dissolved in alcohol. Treatment is continued until the root no longer gives up curcumin to the alcohol. At the end of the process, the alcohol-curcumin mixture is gummy and is called resin. The residual root solids are then filtered out and the alcohol and other volatiles which may be present are distilled off, leaving the usable crystalline powdered curcumin. Inspection of the residual or spent root before discharging it to waste reveals that it has retained a substantial amount of its basic coloring matter, namely, the curcumin.

The chemical composition of curcumin is given in the Merck Index where several references to publications dealing with its extraction are also given. Curcumin is described as an orange-yellow crystalline powder, melting point 180° C., yielding a brownish-red color with alkali and a light-yellow color with acids, soluble in alcohol and glacial acetic acid and insoluble in ether and water.

The traditional commercial process outlined above for producing curcumin has several undesirable aspects. One results from the use of methanol as the extraction alcohol. It is used because it has a good affinity for curcumin, thus increasing yield, but it is toxic and should not be present in a food product. Alcohols and hexane are also combustible which is obviously undesirable.

Another undesirable aspect is that the end product, crystalline curcumin, is not soluble in water. It is also not directly soluble in fatty based substances. To make it soluble and usable as a dispersed coloring agent, it must first be dissolved in a substance which will make it soluble or dispersible in a water based or fatty based food product. Most commonly, it is dossolved in a material which is well known as PS-80 which is a variety of polysorbate. PS-80 is costly and its use requires another step and more handling in a food coloring operation, thus increasing complexity and cost of production. Moreover, when the curcumin coloring matter is dissolved in polysorbate, a water based product, such as the fluid in commercially preserved pickles, does not exhibit the degree of clarity nor the light-yellowish tinge that is desired in products of this kind.

Prior curcumin extraction methods also failed to remove all of the curcumin from the ground turmeric root within a reasonable process time. The natural root as received usually contains 3% to 4.5% of curcumin. As much as 25% of the original curcumin in the root is believed to remain in the ground root waste in some instances when the traditional extraction process is used. This is inferred from the relatively intense orange-yellow color which the residual spent root has. Obviously, to be able to extract substantially all of the curcumin from the root would be desirable from an economic point of view since the curcumin is the valuable part of the root.

SUMMARY OF THE INVENTION

An object of this invention is to overcome the above noted undesirable features in the traditional curcumin extraction process and in the final colorant product produced thereby.

An important object is to provide a curcumin extraction method which yields curcumin in forms that are directly soluble in water based and fatty based products, respectively.

Another object is to maximize the yield of curcumin from the turmeric root to thereby improve the economics of curcumin production.

Still other objects are to provide a curcumin extraction method which is fast, effective, uses simple and inexpensive chemicals for extraction, and avoids the use of alcohol and hexane.

Yet another object is to provide curcumin in forms which enable imparting highly desirable clear, bright and pure yellow color to a variety of water based materials and fatty based materials as well.

Briefly stated, the new process involves circulating a soap solution through a heated tank which contains ground turmeric root until the ground rootstock exhibits little or none of its original dominant orange-brown color. At this time, the curcumin is dissolved in the soap solution and is a dark brown-maroon syrupy viscous substance. After filtering, it is ready for use directly as a water soluble coloring agent which requires dissolving a small quantity in water to impart an intense yellow color to the water.

In a second phase of the method, a batch of the dark viscous fluid is treated with acid until it turns to a yellow precipitant which settles out of the water solvent. The clear water and any other solutes which may be present are filtered out, leaving a paste or putty like agglomeration which is bright yellow. This putty is directly usable as a colorant in fatty materials such as oleo margarine and vegetable oil shortenings and many other food products. The water soluble version previously mentioned is especially useful where a clear bright yellow is desired such that opalescence, which is characteristic of using prior art curcumin coloring agents, is avoided.

How the foregoing and other more specific objects of the invention are achieved will be evident in the ensuing more detailed description of practicing the process in which reference will be made to the accompanying drawing.

DESCRIPTION OF THE DRAWING

The drawing is a schematic diagram of apparatus, essentially a flow diagram, for practicing the process.

DESCRIPTION OF A PREFERRED EMBODIMENT

The method for producing a water soluble type of curcumin compound will be described first in reference to the drawing. Various types of equipment may be used for making the product. In this example, a stainless steel tank 10 is used. The tank comprises an outer wall 11 and an inner wall 12 which define a space 13 through which steam is passed to heat the contents of the tank. The steam inlet at the top of the tank is marked 14 and the outlet for condensate is marked 15. The tank has a cover 16 on which a motor 17 is mounted. This motor has a shaft 18 which extends into the tank. A propeller or agitator 19 is fastened to the shaft for stirring the contents of the tank from the bottom toward the top when the motor is running. A screen 20, made of stainless steel or other noncorrosive material, is mounted near the inner bottom of the tank. This screen supports a filter pad 21. The tank cover is provided with an access door 22 to enable examining and sampling the contents of the tank and to permit removal of the filter and cleaning of the tank. The tank lining 12 should preferably be made of stainless steel. Ordinary steel would yield iron to the water soluble curcumin which is a contaminant that would affect its flavor and color adversely.

An outlet pipe 23 extends from the bottom of the tank. Outlet pipe 23 is part of a fluid circulating circuit which includes a valve 24, a pipe 25, a pump 26 driven by a motor 27, a pipe 28, a Tee 29, a valve 30, and its outlet pipe 31 which leads to the interior of tank 10. Pipe 28 has a Tee 32 to which a valve 33 is coupled. The valve has a discharge pipe 34 which may lead to a filter, not shown. Valve 33 provides a way for discharging the fluid contents of tank 10 when the process, which is to be described in greater detail, only involves making the water soluble form of curcumin. When it is desired to discharge the water soluble curcumin solution from tank 10 after the process is complete, valves 33 and 24 are opened and valve 30 is closed. Pump 26 is then started for it to draw the curcumin bearing fluid from tank 10 through its inlet pipe 25 for discharge through a section of pipe 28 and finally through valve 33.

Tank 10 also has a valve 35 leading to outlet pipe 23 at the bottom of the tank. Valve 35 is opened to let cleaning water and residuals go to waste by way of pipe 36 when the tank is flushed out as is necessary after each batch. Filter pad 21 inside of the tank retains most of the ground root which is depleted of curcumin coloring matter when a batch is completed.

The same tank 10 or preferably an adjacent tank 40 may be used to convert the water soluble form of curcumin to the oil soluble form. Tank 40 has inner and outer walls 41 and 42 which form a jacket for heating steam which flows through the jacket space 43. The inner surfaces of the tank are preferably stainless steel. The jacket is supplied with steam with an inlet pipe 44 and it has an outlet pipe 45 for condensate. The interior of tank 40 has a screen 46 mounted in it which supports a filter mat 47. The tank has a lid 48 in which there is an access door 49. A motor 50 has its shaft extending into tank 40 and there is an impeller 51 on the shaft which, when rotated by the motor, stirs or circulates the contents of tank 40. As in the case of tank 10, impeller 51 is off-center with respect to the tank so a circulating motion is imparted to the fluid when the impeller is turned clockwise as viewed from above.

Tank 40 is shown coupled to tank 10 through valve 30, Tee 29, a valve 52 and a filter 53. The water soluble curcumin solution made in tank 10 may be transferred to tank 40, where the oil soluble variety is made in this example, by running pump 26 while valves 24 and 52 are opened and valves 30, 35 and 33 are closed.

Tank 40 has a discharge pipe 54 at its bottom which connects to the inlet of a suction pump 55. The pump has an outlet pipe 56 and is driven by a motor 57. In connection with the process of making oil soluble curcumin in tank 40, a precipitate constituting the oil soluble curcumin is deposited on filter mat 47 in tank 40. The fluid from which the precipitate is derived is drawn from the bottom of tank 40 through pipe 54 and pump 55 from which the fluid is discharged to waste through discharge pipe 56.

The process for making water soluble curcumin will now be described in detail.

The first step is to grind the turmeric root fingers to a granule size almost as fine as ordinary sugar. A quantity of ground root is then inserted into tank 10 to be washed preliminarily to begin the curcumin extraction process. Washing is done with an aqueous solution of ordinary salt or sodium chloride in a concentration corresponding with 1% Baume scale gravity. The salt solution is introduced to the tank 10 through door 22. It is circulated through the ground turmeric root by operation of pump 26 and by running agitator 19. After a short time, a few minutes for example, the undesirable products washed from the ground root will be in the salt solution. The pump and agitator may then be stopped and the aqueous solution may be drained from the tank by opening valve 35. The ground root which is in suspension or floating during washing settles on the filter mat 21 at this time. The ground root is then rewashed or rinsed with pure water which is finally discharged to waste. The temperatures of the wash and rinse waters are not critical, but the first salt water wash is preferably carried out with the solution above standard temperature but no higher than 60° C.

The salt water wash desirably removes any free dirt and inevitably some bacteria from the ground root. It also desirably removes starches and sugars from the root which are believed to cause cloudiness in products colored by curcumin made by other processes. It also removes camphor which is present in substantial amounts in turmeric root and which would impart undesirable taste and odor to the final water soluble curcurmin product if it were not removed.

Another solution which may be used for the preliminary wash is an aqueous solution of potassium hydroxide (caustic potash, commercial grade). A 33% water solution of 45° commercial grade caustic potash has been used successfully to remove dirt and camphor from the ground root. Other useful solutions might be determined by experimentation.

In accordance with the new process, the curcumin coloring agent is extracted from the previously washed ground root by treating the root with an aqueous soap solution. Generally, suitable soaps can be made by hydrolysis of a vegetable oil under alkaline conditions. Examples are the reaction of any of corn, cottonseed, soybean and castor oil with either or both sodium or potassium hydroxide, that is, caustic soda or caustic potash. A soap solution which has been found to be very effective is one comprised of: 1 part of potassium hydroxide (caustic potash, commercial grade, 45° liquid), 2.25 parts of castor oil and 1.75 parts of water. These ingredients are stirred and slightly warmed to achieve saponification. The general rule for making the soap, regardless of type of vegetable oil and the alkali used, is to add one or the other of oil or alkali to the water vehicle until it appears that saponification is complete. The soap solution can then be diluted, for carrying out the curcumin extraction process, to the extent necessary to obtain the curcumin concentration which is desired.

The next step is to admit the liquid soap into tank 10 which contains the clean curcumin bearing ground turmeric root. The contents of the tank are preferably raised to a temperature of up to 60° C. The solution should be near pH 7 or slightly higher. Agitator 19 is operated as is pump 26 to achieve maximum recirculation and mixing of the soap solution and root. This curcumin dissolving process is carried on until a sample of the root reveals that it has lost its original brownish-orange color and is nearly white. The soap solution at this time has the curcumin dissolved in it and this solution is the concentrated water soluble curcumin coloring agent which may be put to use after it has been filtered. A substantial amount of the natural oils and resins in the turmeric root are also desirably in the soap solution at the end of this step. Any excess alkali in the original soap will react with at least part of these root oils to form more soap.

Before discharging the curcumin extract, the contents of the tank should preferably be raised to a temperature of about 90° C. for a short time after which it should be cooled to room temperature. It appears that this increased heating improves the solubility of the curcumin mixture when it is used in products subsequently.

The water soluble curcumin solution which is drawn from the tank is viscous, almost like syrup, and it is chocolate brown or close to maroon in color. Subsequent to filtering it may be bottled for sale since it is ready for use as a coloring agent for a variety of consumable products where clear, transparent color is desired. Even though the solution is chocolate brown when concentrated as it is when withdrawn from the tank, when it is less concentrated it imparts a yellow color to any water based product in which it is dissolved. By way of example, a liter of water to which 4 drops of the curcumin solution is added turns to a bright, clear and intense yellow with a slight greenish tint. This illustrates how ideal it is for coloring the water in jars of preserved pickles, for example, where that color is considered very desirable.

As stated earlier, the process recovers more of the curcumin coloring from the turmeric root than traditional recovery processes. There could, however, be a little coloring matter left in the ground root after the first process cycle is completed. Thus, rather than discharge the spent root to waste at the completion of a batch, it may be allowed to remain in the tank for being treated with soap solution that is to be used for the next batch. The new soap solution has high affinity for curcumin as compared with the solution in which curcumin is concentrated at the end of a batch. After treating the spent root with the new soap solution, the solution may be withdrawn from the tank and it will have some coloring. The spent root may then be discharged and new ground root may be admitted to the tank and washed with salt water to start a new batch. After this, the slightly colored soap solution may be restored to the tank for treating the new root as described earlier.

It should be noted that the amount of soap in the water or solution with which the raw ground root is treated need not be specified with high precision. The process may be carried out with various soap concentrations which depend on the concentration or intensity of the final water soluble curcumin that is desired.

In any case, the color imparted to water based products by small quantities of the water soluble curcumin stays clear and intense. Curcumin powder which has been obtained with the old alcohol process is usually dissolved in polysorbate before it can be used in a water based product and it fades noticeably within the shelf life of the product.

The second phase of the process, namely, production of an oil soluble or oil miscible curcumin suspension or putty coloring agent, which is also still water soluble, will now be described.

By way of example, the putty may be made in tank 40 using the water soluble soap solution of curcumin made in tank 10 as described above. Assume that a batch has been made in tank 10, the liquid, excluding the spent root, is transferred from tank 10 to tank 40. This is done by operating pump 26 when valves 24 and 52 are open and valves 14, 33 and 35 are closed. Since the liquid is drawn from below filter pad 21 in tank 10, the liquid has little solids in it. However, the pump forces the liquid through filter 53, which is preferably a string filter and which clarifies the liquid further. The solution can still be hot from being treated in tank 10 when treatment of the solution in the next step is begun in tank 40.

When in tank 40, which is lined with stainless steel or other noncorrosive material, acid is added to the water soluble curcumin soap solution. The acidified solution is then stirred by operation of agitator 51. About five minutes of stirring is usually sufficient. The acid causes the curcumin to form an oil based suspension which will precipitate out of the solution. The reaction may be conducted at standard room temperature or slightly above if desired. After 5 minutes, typically, the agitator is stopped and the precipitate is allowed to settle on the filter mat 47. The vacuum pump 55 is then started to draw the fluid from the bottom of tank 40, leaving the oily suspension or putty on the filter 47. The fluid drawn from the bottom of tank 40 appears nearly as clear as water and is discharged to waste. The putty, which is directly usable as a coloring agent, has an exceptionally bright and pure yellow color.

Precipitation of the yellow putty in tank 40 may be brought about with various acids. The amount and concentration of the acid solution depends on the volume of the batch and the concentration of water soluble curcumin in it. Any acid is added until the solution turns to a grainy putty suspension but the pH should be a little above 7.0 or slightly alkaline or basic.

Muriatic acid in 18° concentration has been used successfully as an additive to the chocolate brown curcumin soap solution to effect precipitation. A solution consisting of 50% glacial acetic acid and 50% water also works. A solution consisting of 5% of 18° muriatic acid, 50% by weight of glacial acetic acid and the remainder of water is typical of another acid that may be used. As a general rule, when addition of acid no longer causes additional precipitation, adding acid should be terminated.

The acid adding step results in the desirably high amount of natural resin which was extracted from the root in the first phase of the process becoming a vehicle for the yellow curcumin. The resin and coloring matter precipitate together. This vehicle enhances its ability to disperse color in oil based products. The resin appears to preserve the curcumin so it retains its color in products.

The bright yellow precipitate or putty collected on the filter has unusual and desirable properties. It can be dissolved or dispersed in water based products to impart a yellow color where clarity is not absolutely essential.

The primary intended use, however, is for coloring oil based products. It will dissolve directly in vegetable oils without heating and it will impart a tint of yellow that depends on the amount added. A very small quantity of the bright yellow putty added to a white solid vegetable oil product such as oleomargarine imparts a bright and esthetically pleasing color to the oleomargarine.

The yellow curcumin putty may be added to any water or oil based product that is intended to be pasteurized at the customary 100° C. to 106° C. without loss of color intensity after pasteurization.

It is desirable to store the putty in a cool dark place in the absence of air. Addition of a preservative such as sodium benzoate may be desirable. The putty will turn somewhat dark when it becomes dry in air. Simply wetting it with water and stirring it will restore its bright yellow color and usefulness.

I claim:

1. A method of making a water soluble liquid curcumin - containing coloring agent from turmeric root, which agent is suitable for coloring food, comprising the steps of:
    mixing ground turmeric root and aqueous soap solution consisting essentially of the reaction product of a vegetable oil and an alkali metal hydroxide to dissolve the curcumin in the root into the liquid, and
    separating the root and liquid so the liquid may be used as the coloring agent in food.

2. The method as in claim 1 wherein:
    the soap in said solution comprises the reaction product of castor oil and alkali metal hydroxide.

3. The method as in claim 1 including heating the mixture of turmeric root and soap solution to a temperature of up to 60° C. during mixing.

4. The method as in claim 1 including heating the mixture of turmeric root and soap solution to a temperature of about 90° C. before separating said root and liquid.

5. The method as in claim 1 including the additional steps for using said separated liquid to produce a form of curcumin coloring agent that is soluble in fatty based products, said additional steps comprising:
    adding sufficient acid to said liquid to effect precipitation of a material which contains the curcumin and is bright yellow in color, and
    separating the liquid and the material so the material may be used in fatty based products as a coloring agent.

6. A method of making a water soluble liquid curcumin - containing coloring agent from turmeric root, which agent is suitable for coloring food, comprising the steps of:
    placing a quantity of ground turmeric root in a vessel,
    washing said ground root in said vessel with a first solution for removing at least some of the camphor and other undesirable constituents from said root,
    separating the washing solution from said root to obtain the residual washed root, then
    mixing said residual root and an aqueous soap solution consisting essentially of the reaction product of a vegetable oil and an alkali metal hydroxide for dissolving the curcumin in the root into the soap solution and heating the mixture during mixing, and then
    separating the ground spent root from the liquid containing the soap and curcumin so the liquid may be used as the coloring agent in food.

7. The method as in claim 6 wherein said soap is the reaction product of castor oil and an alkali metal hydroxide.

8. The method as in claim 6 wherein the reactants forming said soap in said aqueous solution are about 1 part by volume of an alkali metal hydroxide having 45° liquid gravity and about 2.25 parts of castor oil.

9. The method as in claim 8 wherein said acid is glacial acetic acid dissolved in water.

10. The method as in claim 6 wherein the mixture of root and soap solution is heated to a temperature of about 60° C. during said mixing.

11. The method as in claim 6 including heating the mixture of turmeric root and soap solution to a temperature of about 90° C.

12. The method as in claim 6 including the additional steps for using said separated liquid to produce a form of curcumin coloring agent that is soluble in fatty based food products, said additional steps comprising:
    adding sufficient acid to said liquid which contains the curcumin to effect precipitation of a material which contains the curcumin and is bright yellow in color, and
    separating the liquid and material so the material may be used in fatty based food products as a coloring agent.

13. The method as in claim 12 wherein addition of said acid is terminated when said liquid is still slightly alkaline.

14. The method as in claim 12 wherein said acid is muriatic acid.

* * * * *